United States Patent
King et al.

(10) Patent No.: US 7,417,798 B2
(45) Date of Patent: Aug. 26, 2008

(54) MICROREPLICATED ARTICLE

(75) Inventors: Vincent W. King, Woodbury, MN (US);
John S. Huizinga, Dellwood, MN (US);
William V. Dower, Austin, TX (US);
David W. Kuhns, Minneapolis, MN
(US); Gregory F. King, Minneapolis,
MN (US); John T. Strand, Stillwater,
MN (US); Thomas B. Hunter, deceased,
late of Mendota Heights MN (US); by
Thelma Hunter, legal representative,
Mendota Heights, MN (US); by **Samuel
Hunter**, legal representative, Mendota
Heights, MN (US); James N. Dobbs,
Woodbury, MN (US); **Daniel H.
Carlson, Arden Hills, MN (US); Larry
D. Humlicek**, Ham Lake, MN (US)

(73) Assignee: 3M Innovative Properties Company,
St. Paul, MN (US)

( * ) Notice: Subject to any disclaimer, the term of this patent is extended or adjusted under 35 U.S.C. 154(b) by 0 days.

(21) Appl. No.: 11/747,462

(22) Filed: May 11, 2007

(65) Prior Publication Data

US 2007/0211347 A1 Sep. 13, 2007

Related U.S. Application Data

(63) Continuation of application No. 10/658,730, filed on Sep. 9, 2003, now Pat. No. 7,224,529.

(51) Int. Cl.
*G02B 27/10* (2006.01)
(52) U.S. Cl. ........................ 359/619; 359/618

(58) Field of Classification Search ................. 359/619
See application file for complete search history.

(56) References Cited

U.S. PATENT DOCUMENTS

| | | | |
|---|---|---|---|
| 3,241,429 A | 3/1966 | Rice et al. |
| 3,374,303 A | 3/1968 | Metz, Jr. |
| 3,551,544 A | 12/1970 | Hinka |
| 3,893,795 A | 7/1975 | Nauta |
| 3,917,772 A | 11/1975 | Hollenbeck |
| 4,177,304 A | 12/1979 | Berry |

(Continued)

FOREIGN PATENT DOCUMENTS

EP 0 961 138 1/1999

(Continued)

OTHER PUBLICATIONS

Article: Sasagawa, "P.51: Dual Directional Backlight for Stereoscopic LCD," *SID 03 Digest*, (2003), pp. 1/3.

(Continued)

*Primary Examiner*—Jordan M. Schwartz
*Assistant Examiner*—James C Jones
(74) *Attorney, Agent, or Firm*—Daniel R. Pastirik

(57) ABSTRACT

A microreplicated article is disclosed. The article includes a web including first and second opposed surfaces. The first surface includes a first microreplicated structure having a plurality of first features. The second surface includes a second microreplicated structure having a plurality of second features. Corresponding opposed features cooperate to form a lens features.

6 Claims, 10 Drawing Sheets

U.S. PATENT DOCUMENTS

| | | | |
|---|---|---|---|
| 4,414,316 | A | 11/1983 | Conley |
| 4,420,502 | A | 12/1983 | Conley |
| 4,448,739 | A | 5/1984 | Baus |
| 4,469,645 | A | 9/1984 | Eigenmann |
| 4,615,090 | A | 10/1986 | Baus |
| 4,744,936 | A | 5/1988 | Bittner, Jr. |
| 4,781,975 | A | 11/1988 | Baus |
| 4,836,874 | A | 6/1989 | Foster |
| 4,892,336 | A | 1/1990 | Kaule et al. |
| 5,087,191 | A | 2/1992 | Heise et al. |
| 5,164,227 | A | 11/1992 | Miekka et al. |
| 5,333,072 | A | 7/1994 | Willett |
| 5,691,846 | A | 11/1997 | Benson, Jr. et al. |
| 5,728,449 | A | 3/1998 | Steininger et al. |
| 5,800,723 | A | 9/1998 | Juskey et al. |
| 5,922,238 | A | 7/1999 | Savant et al. |
| 6,024,455 | A | 2/2000 | O'Neill et al. |
| 6,025,897 | A | 2/2000 | Weber et al. |
| 6,074,192 | A | 6/2000 | Mikkelsen |
| 6,124,971 | A | 9/2000 | Ouderkirk et al. |
| 6,187,250 | B1 | 2/2001 | Champagne |
| 6,197,397 | B1 | 3/2001 | Sher et al. |
| 6,272,275 | B1 | 8/2001 | Cortright et al. |
| 6,272,982 | B1 | 8/2001 | Stauffacher et al. |
| 6,280,063 | B1 * | 8/2001 | Fong et al. .................. 362/333 |
| 6,325,880 | B1 | 12/2001 | Yamashita et al. |
| 6,368,682 | B1 | 4/2002 | Fong |
| 6,373,636 | B1 | 4/2002 | Conley |
| 6,483,976 | B2 | 11/2002 | Shie et al. |
| 6,495,214 | B1 | 12/2002 | Prix et al. |
| 6,630,970 | B2 | 10/2003 | Trapani et al. |
| 6,724,536 | B2 * | 4/2004 | Magee ....................... 359/619 |
| 6,767,594 | B1 | 7/2004 | Miroshin et al. |
| 6,870,674 | B2 * | 3/2005 | Ookawa et al. ............. 359/455 |
| 6,908,295 | B2 | 6/2005 | Thielman et al. |
| 7,101,437 | B2 | 9/2006 | Boutilier et al. |
| 7,121,693 | B2 | 10/2006 | Klose |
| 7,140,812 | B2 | 11/2006 | Bryan et al. |
| 7,165,959 | B2 | 1/2007 | Humlicek et al. |
| 2002/0177082 | A1 * | 11/2002 | Brady et al. ................ 430/320 |
| 2002/0196563 | A1 | 12/2002 | Itoh |
| 2003/0075269 | A1 | 4/2003 | Prix et al. |
| 2003/0081331 | A1 | 5/2003 | Abe |
| 2003/0102591 | A1 | 6/2003 | Theilman et al. |
| 2003/0108710 | A1 | 6/2003 | Coyle et al. |
| 2005/0008821 | A1 | 1/2005 | Pricone |
| 2005/0051931 | A1 | 3/2005 | Humlicek et al. |
| 2005/0052750 | A1 | 3/2005 | King et al. |
| 2006/0061869 | A1 | 3/2006 | Fadel et al. |

FOREIGN PATENT DOCUMENTS

| | | |
|---|---|---|
| EP | 1352732 A2 | 10/2003 |
| JP | 01-159627 | 6/1989 |
| JP | 04-299329 | 10/1992 |
| WO | WO 93/23244 | 11/1993 |
| WO | WO 94/01288 | 1/1994 |
| WO | WO 98/52733 | 11/1998 |
| WO | WO 99/00700 | 1/1999 |

OTHER PUBLICATIONS

Dictionary Excerpt: *Webster's Ninth New Collegiate Dictionary*, Merriam/Webster Inc., 1990, pp. 992 and 1169.

* cited by examiner

MICROREPLICATED ARTICLE

PRIORITY

This application is a continuation of U.S. application Ser. No. 10/658,730, filed Sep. 9, 2003 now U.S. Pat. No. 7,224,529, the disclosure of which is incorporated by reference in their entirety herein.

FIELD

The disclosure relates generally to the continuous casting of material onto a web, and more specifically to the casting of articles having a high degree of registration between the patterns cast on opposite sides of the web.

BACKGROUND

In the fabrication of many articles, from the printing of newspapers to the fabrication of sophisticated electronic and optical devices, it is necessary to apply some material that is at least temporarily in liquid form to opposite sides of a substrate. It is often the case that the material applied to the substrate is applied in a predetermined pattern; in the case of e.g. printing, ink is applied in the pattern of letters and pictures. It is common in such cases for there to be at least a minimum requirement for registration between the patterns on opposite sides of the substrate.

When the substrate is a discrete article such as a circuit board, the applicators of a pattern may usually rely on an edge to assist in achieving registration. But when the substrate is a web and it is not possible to rely on an edge of the substrate to periodically refer to in maintaining registration, the problem becomes a bit more difficult. Still, even in the case of webs, when the requirement for registration is not severe, e.g. a drift out of perfect registration of greater than 100 microns is tolerable, mechanical expedients are known for controlling the material application to that extent. The printing art is replete with devices capable of meeting such a standard.

However, in some products having patterns on opposite sides of a substrate, a much more accurate registration between the patterns is required. In such a case, if the web is not in continuous motion, apparatuses are known that can apply material to such a standard. And if the web is in continuous motion, if it is tolerable, as in e.g. some types of flexible circuitry, to reset the patterning rolls to within 100 microns, or even 5 microns, of perfect registration once per revolution of the patterning rolls, the art still gives guidelines about how to proceed.

However, in e.g. optical articles such as brightness enhancement films, it is required for the patterns in the optically transparent polymer applied to opposite sides of a substrate to be out of registration by no more than a very small tolerance at any point in the tool rotation. Thus far, the art is silent about how to cast a patterned surface on opposite sides of a web that is in continuous motion so that the patterns are kept continuously, rather than intermittently, in registration within 100 microns.

SUMMARY

An aspect of the present disclosure is directed to a microreplicated article. The microreplicated article includes a flexible substrate having first and second opposed surfaces, a first coated microreplicated pattern on the first surface, and a second coated microreplicated pattern on the second surface. The first and second microreplicated patterns are registered to better than about 100 microns, and preferably are registered to within about 75 microns, and more preferably to within about 50 microns, and most preferably to within about 10 microns and the first microreplicated pattern includes features having a first shape and the second microreplicated pattern includes features having a second shape. Each feature of the first pattern cooperates with a corresponding feature of the second pattern to form a lenticular lens.

Definitions

In the context of this disclosure, "registration," means the positioning of structures in a set location in relation to the edge of a web and to other structures on the opposite side of the same web.

In the context of this disclosure, "web" means a sheet of material having a fixed dimension in one direction and either a predetermined or indeterminate length in the orthogonal direction.

In the context of this disclosure, "continuous registration," means that at all times during rotation of first and second patterned rolls the degree of registration between structures on the rolls is better than a specified limit.

In the context of this disclosure, "microreplicated" or "microreplication" means the production of a microstructured surface through a process where the structured surface features retain an individual feature fidelity during manufacture, from product-to-product, that varies no more than about 100 micrometers.

BRIEF DESCRIPTION OF THE DRAWING

In the several figures of the attached drawing, like parts bear like reference numerals, and.

DETAILED DESCRIPTION

Generally, the invention of the present disclosure is directed to a flexible substrate coated with microreplicated patterned structures on each side. The microreplicated articles are registered with respect to one another to a high degree of precision. Preferably, the structures on opposing sides cooperate to give the article optical qualities as desired, and more preferably, the structures are a plurality of lens features.

EXAMPLE #1

Microreplicated Article

Figure 12:
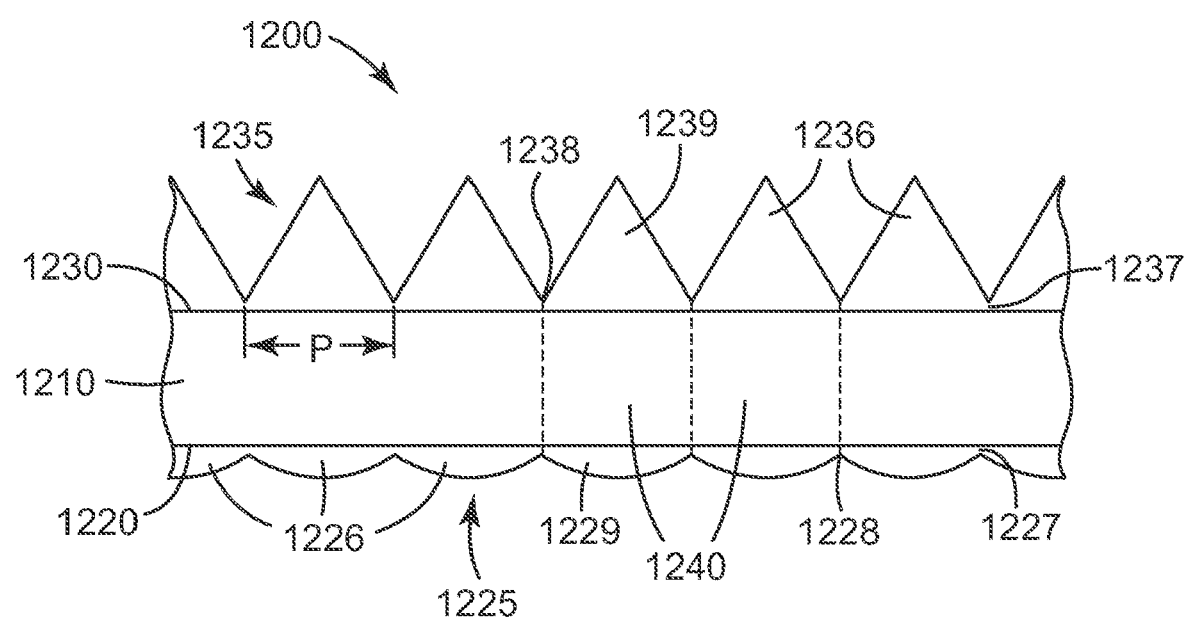
FIG. 12 illustrates a cross-sectional view of an article made according to the present disclosure.

Referring to FIG. 12, illustrated is an example embodiment of a two-sided microreplicated article 1200. The article 1200 includes a web 1210 substrate having opposed first and second surfaces 1220, 1230. First and second surfaces 1220, 1230 include first and second microreplicated structures 1225, 1235, respectively. First microreplicated structure 1225 includes a plurality of arcuate features 1226, which in the embodiment shown are cylindrical lenses with an effective diameter of about 142 microns. Second microreplicated structure 1235 includes a plurality of saw-tooth or pyramidal prismatic features 1236.

In the example embodiment shown, first and second features 1226, 1236 have the same pitch or period of repetition P, e.g., the period of the first feature is about 150 microns, and the period of repetition of the second feature is the same. Typically, the ratio of the period of the first and second features is a whole number ratio (or the inverse), though other combinations are permissible. The features shown are of indefinite length in a down-web direction.

In the example embodiment shown, opposed microreplicated features 1226, 1236 cooperate to form a plurality of lens features 1240. In the example embodiment shown, the lens features 1240 are lenticular lenses. Since the performance of each lens feature 1240 is a function of the alignment of the opposed features 1229, 1239 forming each lens, precision alignment or registration of the lens features is preferable.

Optionally, the article 1200 also includes first and second land areas 1227, 1237. The land area is defined as the material between the substrate surfaces 1220, 1230 and the bottom of each respective feature, i.e., valleys 1228, 1238. Typically, the first land area 1228 is at least about 10 microns on the lens side and the second land area 1238 is about at least about 25 microns on the prism side. The land area assists in the features having good adherence to the web and also aid in replication fidelity.

The article 1200 described above was made using an apparatus and method for producing precisely aligned microreplicated structures on opposed surfaces of the web, the apparatus and methods which are described in detail below. The embodiment produced by Applicants was made using the using a web made from polyethylene terephthalate (PET), 0.0049 inches thick. Other web materials can be used, for example, polycarbonate.

The first microreplicated structure was made on a first patterned roll by casting and curing a curable liquid onto the first side of the web. The first curable liquid was a light sensitive acrylate resin solution including photomer 6010, available from Cognis Corp., Cincinnati, Ohio; SR385 tetrahydrofurfuryl acrylate and SR238 (70/15/15%) 1,6-hexanediol diacrylate, both available from Satomer Co., Expon, Pa.; Camphorquinone, available from Hanford Research Inc., Stratford, Conn.; and Ethyl-4-dimethylamino Benzoate (0.75/0.5%), available from Aldrich Chemical Co., Milwaukee, Wis. The second microreplicated structure was made on a second patterned roll by casting and curing a curable liquid onto the second side of the web. The second curable liquid used was the same as the first curable liquid.

After each respective structure was cast into a pattern, each respective pattern was externally cured using a curing light source including an ultraviolet light source. A peel roll was then used to remove the microreplicated article from the second patterned roll. Optionally, a release agent or coating can be used to assist removal of the patterned structures from the patterned tools.

The process settings used to create the article described above are as follows. A web speed of about 1.0 feet per minute with a web tension into and out of casting apparatus of about 2.0 pounds force were used. A peel roll draw ratio of about 5% was used to pull the web off the second patterned tool. A nip pressure of about 4.0 pounds force was used. The gap between the first and second patterned rolls was about 0.010 inches. Resin was supplied to the first surface of the web using a dropper coating apparatus and resin was supplied to the second surface at a rate of about 1.35 ml/min, using a syringe pump.

Curing the first microreplicated structure was accomplished with an Oriel 200-500 W Mercury Arc Lamp at maximum power and a Fostec DCR II at maximum power, with all the components mounted sequentially. Curing the second microreplicated structure was accomplished with a Spectral Energy UV Light Source, a Fostec DCR II at maximum power, and an RSLI Inc. Light Pump 150 MHS, with all the components mounted sequentially.

The first patterned roll included a series of negative images for forming cylindrical lenses with a 142 micron diameter at 150 micron pitch. The second patterned roll included a series of negative images for forming a plurality of symmetric prisms with 60 degree included angle at 150 micron pitch.

Generally, the invention of the present disclosure can be made by a system and method, disclosed hereinafter, for producing two-sided microreplicated structures with side-to-side registration of better than about 100 microns, and preferably better than 50 microns, and more preferably less than 25 microns, and most preferably less than 5 microns. The system generally includes a first patterning assembly and a second patterning assembly. Each respective assembly creates a microreplicated pattern on a respective surface of a web having a first and a second surface. A first pattern is created on the first side of the web and a second pattern is created on the second surface of the web.

Each patterning assembly includes means for applying a coating, a patterning member, and a curing member. Typically, patterning assemblies include patterned rolls and a support structure for holding and driving each roll. Coating means of the first patterning assembly dispenses a first curable coating material on a first surface of the web. Coating means of the second patterning assembly dispenses a second curable coating material on a second surface of the web, wherein the second surface is opposite the first surface. Typically, first and second coating materials are of the same composition.

After the first coating material is placed on the web, the web passes over a first patterned member, wherein a pattern is created in the first coating material. The first coating material is then cured or cooled to form the first pattern. Subsequently, after the second coating material is placed on the web, the web passes over a second patterned member, wherein a pattern is created in the second coating material. The second coating material is then cured to form the second pattern. Typically, each patterned member is a microreplicated tool and each tool typically has a dedicated curing member for curing the material. However, it is possible to have a single curing member that cures both first and second patterned materials. Also, it is possible to place the coatings on the patterned tools.

The system also includes means for rotating the first and second patterned rolls such that their patterns are transferred to opposite sides of the web while it is in continuous motion, and said patterns are maintained in continuous registration on said opposite sides of the web to better than about 100 microns.

An advantage of the present invention is that a web having a microreplicated structure on each opposing surface of the web can be manufactured by having the microreplicated structure on each side of the web continuously formed while keeping the microreplicated structures on the opposing sides registered generally to within 100 microns of each other, and typically within 50 microns, and more typically within 20 microns, and most typically within 5 microns.

Figure 1:
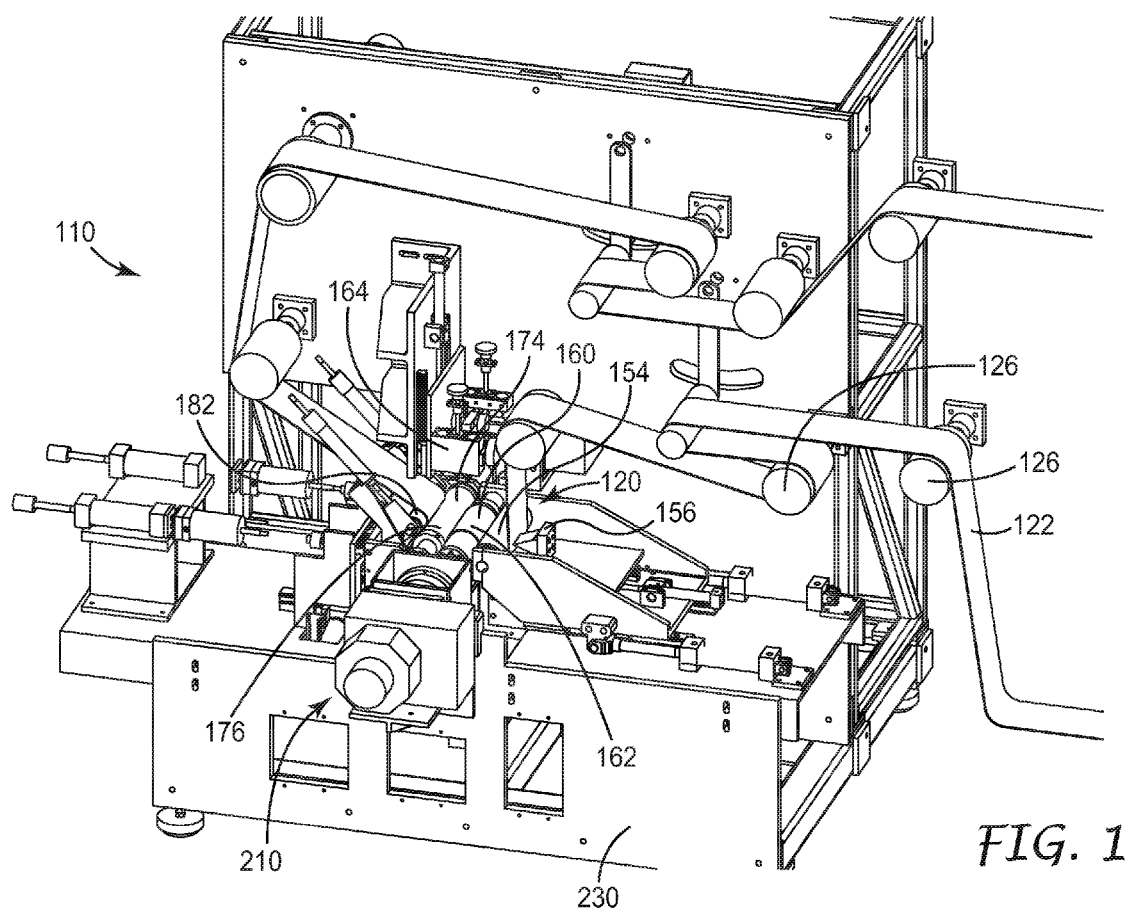
FIG. 1 illustrates a perspective view of an example embodiment of a system including a system according to the present disclosure.
Figure 2:
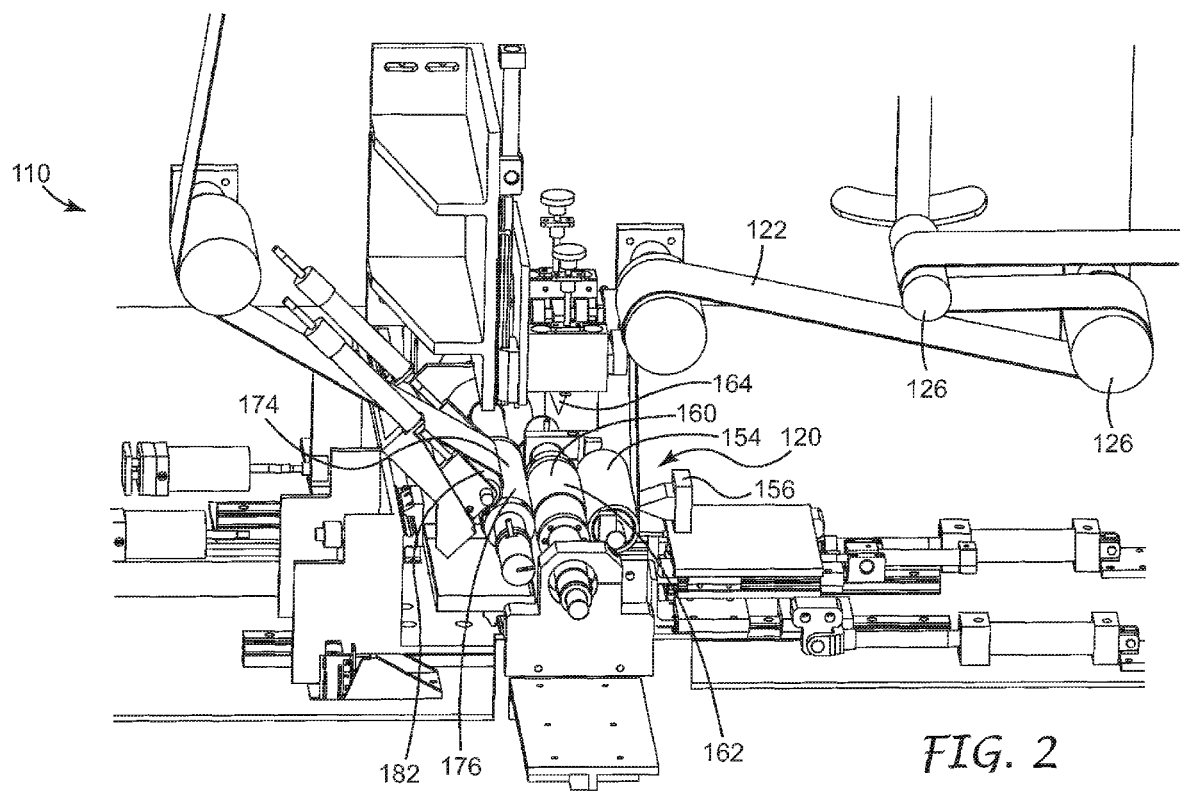
FIG. 2 illustrates a close-up view of a portion of the system of FIG. 1 according to the present disclosure.

Referring now to FIGS. 1-2, an example embodiment of a system 110 including casting apparatus 120 according to the present disclosure is illustrated. In the depicted casting apparatus 120, a web 122 is provided to the casting apparatus 120 from a main unwind spool (not shown). The exact nature of web 122 can vary widely, depending on the product being produced. However, when the casting apparatus 120 is used for the fabrication of optical articles it is usually convenient for the web 122 to be translucent or transparent, to allow curing through the web 122. The web 122 is directed around various rollers 126 into the casting apparatus 120.

Accurate tension control of the web 122 is required to achieve the best results the invention is capable of, so the web 122 is directed over a tension-sensing device (not shown). In situations where it is desirable to use a liner web to protect the web 122, the liner web is typically separated at the unwind spool and directed onto a liner web wind-up spool (not shown). The web 122 is typically directed via an idler roll to a dancer roller for precision tension control. Idler rollers direct the web 122 to a position between nip roller 154 and first coating head 156.

In the depicted embodiment, first coating head 156 is a die coating head. However, other coating methods can be adapted to the apparatus, as one of ordinary skill in the art will appreciate. The web 122 then passes between the nip roll 154 and first patterned roll 160. The first patterned roll 160 has a patterned surface 162, and when the web 122 passes between the nip roller 154 and the first patterned roll 160 the material dispensed onto the web 122 by the first coating head 156 is shaped into a negative of patterned surface 162.

While the web 122 is in contact with the first patterned roll 160, material is dispensed from second coating head 164 onto the other surface of web 122. In parallel with the discussion above with respect to the first coating head 156, the second coating head 164 is also a die coating arrangement including a second extruder (not shown) and a second coating die (not shown). In some embodiments, the material dispensed by the first coating head 156 is a composition including a polymer precursor and intended to be cured to solid polymer with the application of ultraviolet radiation.

Material that has been dispensed onto web 122 by the second coating head 164 is then brought into contact with second patterned roll 174 with a second patterned surface 176. In parallel with the discussion above, in some embodiments, the material dispensed by the second coating head 164 is a composition including a polymer precursor and intended to be cured to solid polymer with the application of ultraviolet radiation.

At this point, the web 122 has had a pattern applied to both sides. A peel roll 182 may be present to assist in removal of the web 122 from second patterned roll 174. Typically, web tension into and out of the casting apparatus is nearly constant.

The web 122 having a two-sided microreplicated pattern is then directed to a wind-up spool (not shown) via various idler rolls. If an interleave film is desired to protect web 122, it is typically provided from a secondary unwind spool (not shown) and the web and interleave film are wound together on the wind-up spool at an appropriate tension.

Figure 3:
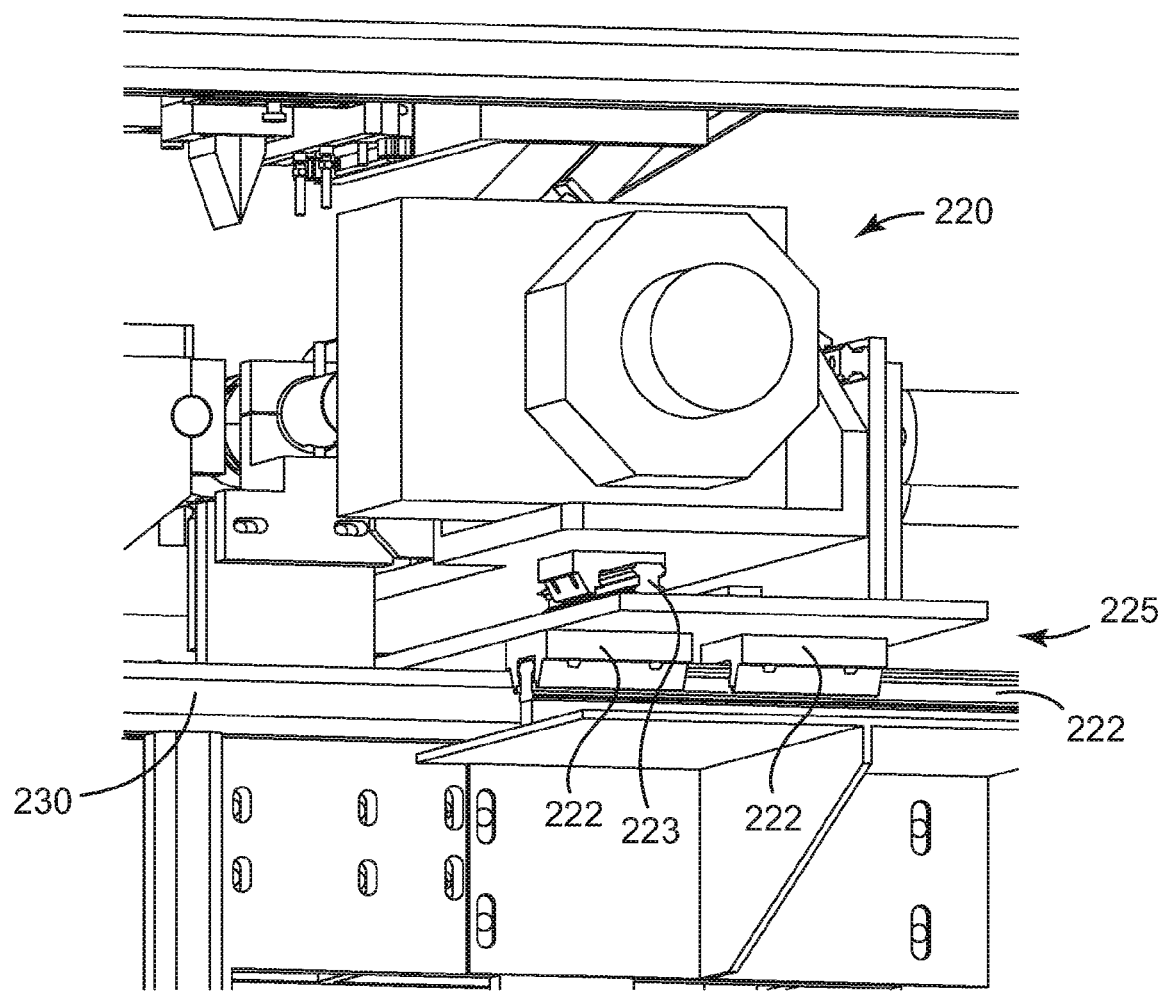
FIG. 3 illustrates another perspective view of the system of FIG. 1 according to the present disclosure.

Referring to FIGS. 1-3, first and second patterned rolls are coupled to first and second motor assemblies 210, 220, respectively. Support for the motor assemblies 210, 220 is accomplished by mounting assemblies to a frame 230, either directly or indirectly. The motor assemblies 210, 220 are coupled to the frame using precision mounting arrangements. In the example embodiment shown, first motor assembly 210 is fixedly mounted to frame 230. Second motor assembly 220, which is placed into position when web 122 is threaded through the casting apparatus 120, needs to be positioned repeatedly and is therefore movable, both in the cross—and machine direction. Movable motor arrangement 220 is preferably coupled to linear slides 222 to assist in repeated accurate positioning, for example, when switching between patterns on the rolls. Second motor arrangement 220 also includes a second mounting arrangement 225 on the backside of the frame 230 for positioning the second patterned roll 174 side-to-side relative to the first patterned roll 160. Second mounting arrangement 225 preferably includes linear slides 223 allowing accurate positioning in the cross machine directions.

Figure 6:
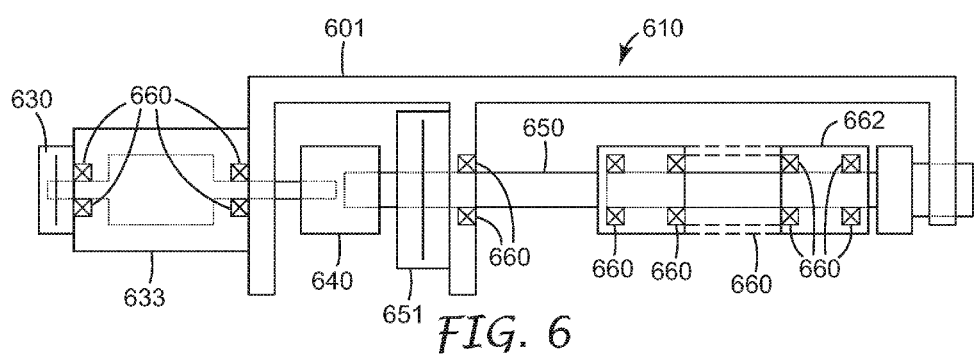
FIG. 6 illustrates a schematic view of an example embodiment of a roll mounting arrangement according to the present disclosure.

Referring to FIG. 6, a motor mounting arrangement is illustrated. A motor 633 for driving a tool or patterned roll 662 is mounted to the machine frame 650 and connected through a coupling 640 to a rotating shaft 601 of the patterned roller 662. The motor 633 is coupled to a primary encoder 630. A secondary encoder 651 is coupled to the tool to provide precise angular registration control of the patterned roll 662. Primary 630 and secondary 651 encoders cooperate to provide control of the patterned roll 662 to keep it in registration with a second patterned roll, as will be described further hereinafter.

Figure 7:
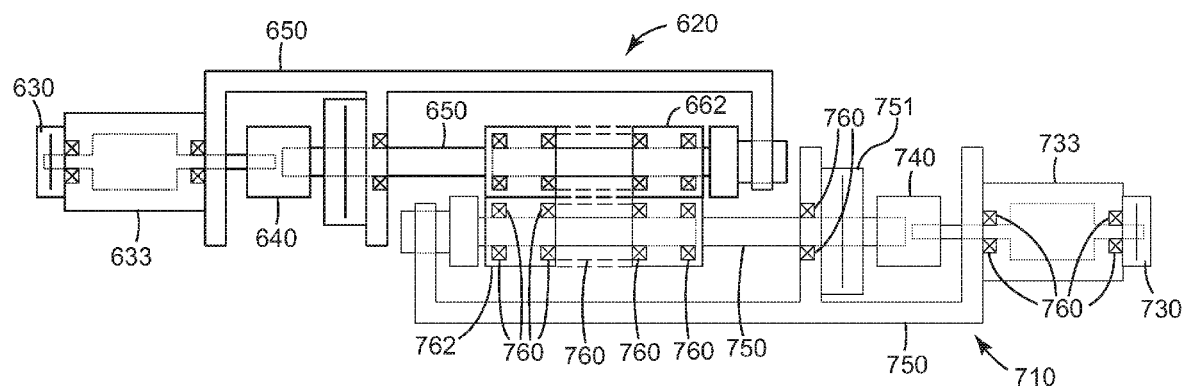
FIG. 7 illustrates a schematic view of an example embodiment of a mounting arrangement for a pair of patterned rolls according to the present disclosure.

In the example embodiment shown, the tool roller 662 diameter is typically smaller than its motor 633 diameter. To accommodate this arrangement, the two tool roller assemblies 610, 710 are installed as mirror images in order to be able to bring the two tool rollers 662, 762 together as shown in FIG. 7. Referring also to FIG. 1, the first motor arrangement is typically fixedly attached to the frame and the second motor arrangement is positioned using movable optical quality linear slides. Reduction or elimination of shaft resonance is important as this is a source of registration error allowing pattern position control within the specified limits. Using a coupling 640 between the motor 633 and shaft 650 that is larger than general sizing schedules specify will also reduce shaft resonance caused by more flexible couplings. Bearing assemblies 660 are located in various locations to provide rotational support for the motor arrangement.

Figure 4:
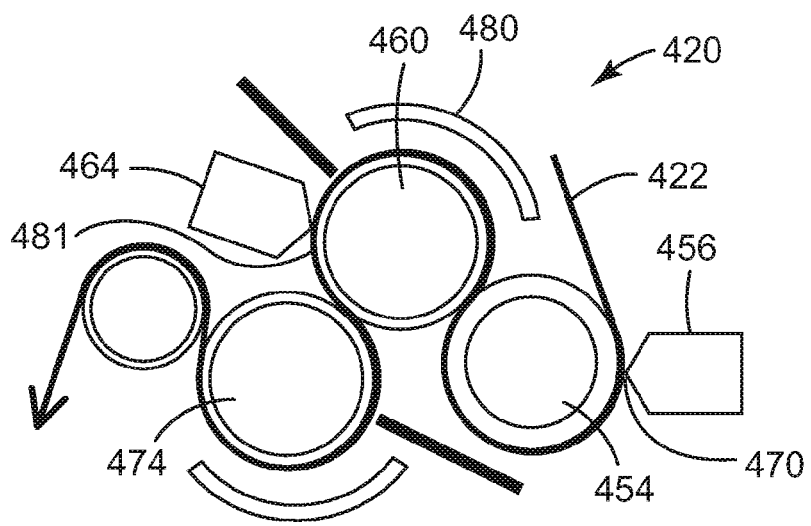
FIG. 4 illustrates a schematic view of a an example embodiment of a casting apparatus according to the present disclosure.

Referring to FIG. 4, an example embodiment of a casting apparatus 420 for producing a two-sided web 422 with registered microreplicated structures on opposing surfaces is illustrated. Assembly includes first and second coating means 456, 464, a nip roller 454, and first and second patterned rolls 460, 474. Web 422 is presented to the first coating means 456, in this example a first extrusion die 456. First die 456 dispenses a first curable liquid layer coating 470 onto the web 422. First coating 470 is pressed into the first patterned roller 460 by means of a nip roller 454, typically a rubber covered roller. While on the first patterned roll 460, the coating is cured using an external curing source 480, for example, a lamp, of suitable wavelength light, typically an ultraviolet light.

A second curable liquid layer 481 is coated on the opposite side of the web 422 using a second side extrusion die 464. The second layer 481 is pressed into the second patterned tool roller 474 and the curing process repeated for the second coating layer 481. Registration of the two coating patterns is achieved by maintaining the tool rollers 460, 474 in a precise angular relationship with one another, as will be described hereinafter.

Figure 5:
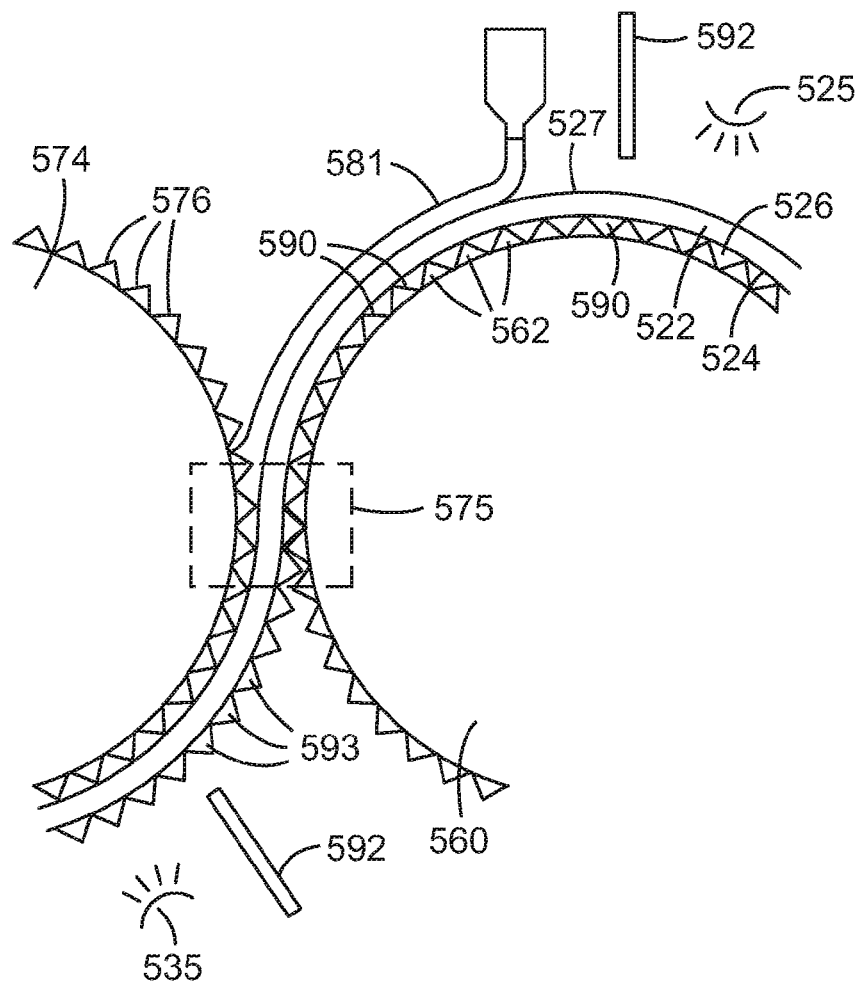
FIG. 5 illustrates a close-up view of a section of the casting apparatus of FIG. 4 according to the present disclosure.

Referring to FIG. 5, a close-up view of a portion of first and second patterned rolls 560, 574 is illustrated. First patterned roll 560 has a first pattern 562 for forming a microreplicated surface. Second pattern roll 574 has a second microreplicated pattern 576.

In the example embodiment shown, first and second patterns 562, 576 are the same pattern, though the patterns may be different. As a web 522 passes over the first roll 560, a first curable liquid (not shown) on a first surface 524 is cured by a curing light source 525 near a first region 526 on the first patterned roll 560. A first microreplicated patterned structure 590 is formed on the first side 524 of the web 522 after the liquid is cured. The first patterned structure 590 is a negative of the pattern 562 on the first patterned roll 560. After the first patterned structure 590 is formed, a second curable liquid 581 is dispensed onto a second surface 527 of the web 522. To insure that the second liquid 581 is not cured prematurely, the second liquid 581 is isolated from the first curing light 525, typically by a locating the first curing light 525 so that it does not fall on the second liquid 581. Alternatively, shielding means 592 can be placed between the first curing light 525 and the second liquid 581. Also, the curing sources can be located inside their respective patterned rolls where it is impractical or difficult to cure through the web.

After the first patterned structure 590 is formed, the web 522 continues along the first roll 560 until it enters the gap region 575 between the first and second patterned rolls 560, 574. The second liquid 581 then engages the second pattern 576 on the second patterned roll and is shaped into a second microreplicated structure, which is then cured by a second curing light 535. As the web 522 passes into the gap 575 between first and second patterned rolls 560, 574, the first patterned structured 590, which is by this time substantially cured and bonded to the web 522, restrains the web 522 from slipping while the web 522 begins moving into the gap 575 and around the second patterned roller 574. This removes web stretching and slippages as a source of registration error between the first and second patterned structures formed on the web.

By supporting the web 522 on the first patterned roll 560 while the second liquid 581 comes into contact with the second patterned roll 574, the degree of registration between the first and second microreplicated structures 590, 593 formed on opposite sides 524, 527 of the web 522 becomes a function of controlling the positional relationship between the surfaces of the first and second patterned rolls 560, 574. The S-wrap of the web around the first and second patterned rolls 560, 574 and between the gap 575 formed by the rolls minimizes effects of tension, web strain changes, temperature, microslip caused by mechanics of nipping a web, and lateral position control. Typically, the S-wrap maintains the web 522 in contact with each roll over a wrap angle of 180 degrees, though the wrap angle can be more or less depending on the particular requirements.

To increase the degree of registration between the patterns formed on opposite surfaces of a web, it preferred to have a low-frequency pitch variation around the mean diameter of each roll. Typically, the patterned rolls are of the same mean diameter, though this is not required. It is within the skill and knowledge of one having ordinary skill in the art to select the proper roll for any particular application.

EXAMPLE #2

Apparatus for Making Two-sided Microreplicated Article

Because the features sizes on the microreplicated structures on both surfaces of a web are desired to be within fine registration of one another, the patterned rolls need to be controlled with a high degree of precision. Cross-web registration within the limits described herein can be accomplished by applying the techniques used in controlling machine-direction registration, as described hereinafter. Control of registration in the machine direction is required, which heretofore has not been achieved in two-sided microreplicated webs. For example, to achieve about 10 microns end-to-end feature placement on a 10-inch circumference patterned roller, each roller must be maintained within a rotational accuracy of ±32 arc-seconds per revolution. Control of registration becomes more difficult as the speed the web travels through the system is increased.

Applicants have built and demonstrated a system having 10-inch circular patterned rolls that can create a web having patterned features on opposite surfaces of the web that are registered to within 2.5 microns. Upon reading this disclosure and applying the principles taught herein, one of ordinary skill in the art will appreciate how to accomplish the degree of registration for other microreplicated surfaces.

Figure 8:
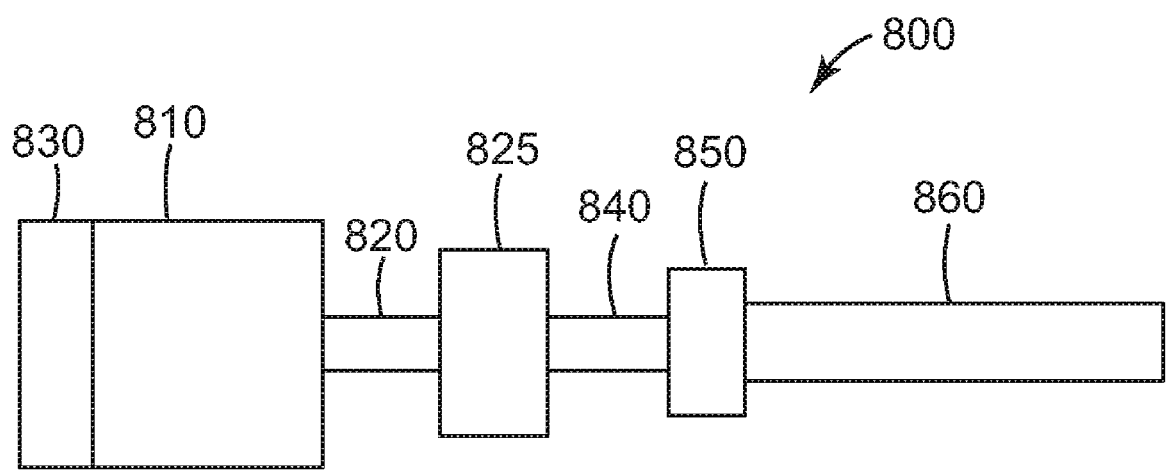
FIG. 8 illustrates a schematic view of an example embodiment of a motor and roll arrangement according to the present disclosure.

Referring to FIG. 8, a schematic of a motor arrangement 800 used in Applicants' system is illustrated. Motor arrangement includes a motor 810 including a primary encoder 830 and a drive shaft 820. Drive shaft 820 is coupled to a driven shaft 840 of patterned roll 860 through a coupling 825. A secondary, or load, encoder 850 is coupled to the driven shaft 840. Using two encoders in the motor arrangement described allows the position of the patterned roll to be measured more accurately by locating the measuring device (encoder) 850 near the patterned roll 860, thus reducing or eliminating effects of torque disturbances when the motor arrangement 800 is operating.

Figure 9:
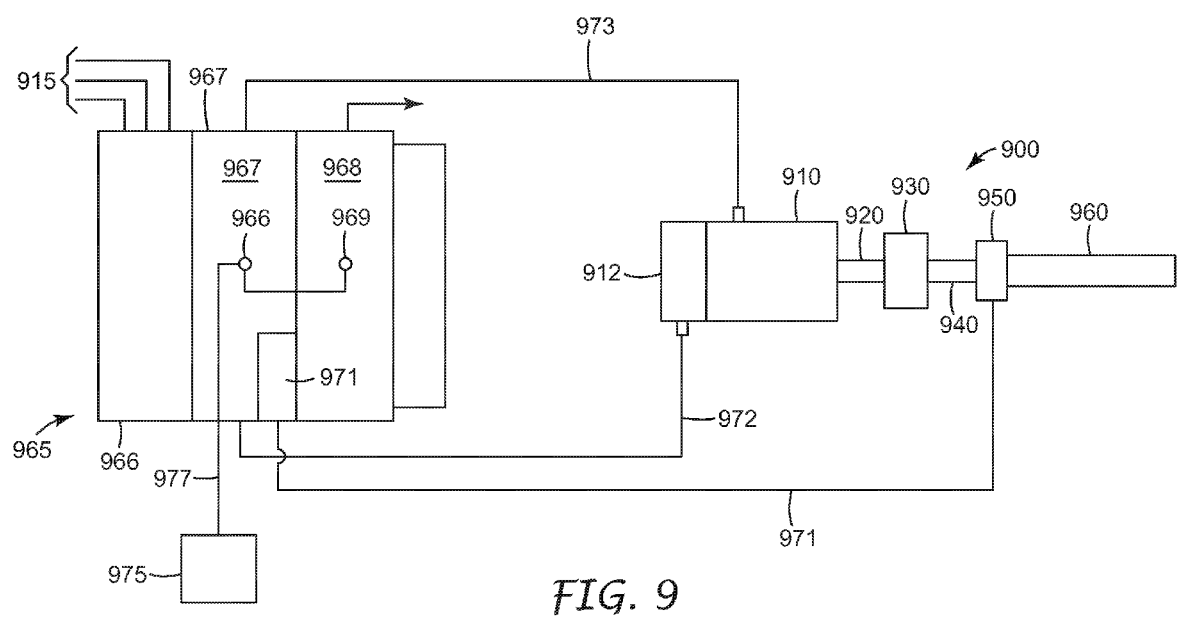
FIG. 9 illustrates a schematic view of an example embodiment of a means for controlling the registration between rolls according to the present disclosure.
Figure 10:
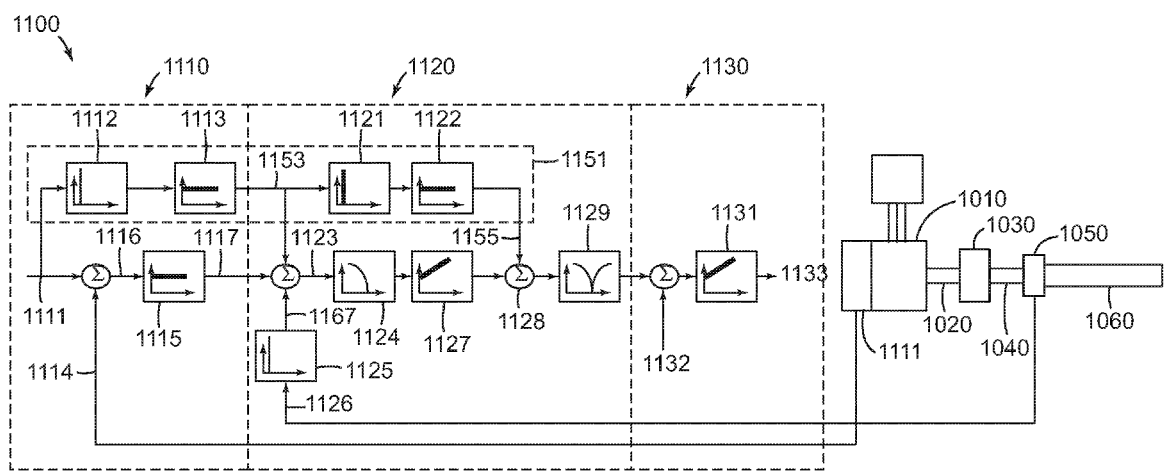
FIG. 10 illustrates a schematic view of an example embodiment of a roll controlling arrangement according to the present disclosure.

Referring to FIG. 9, a schematic of the motor arrangement of FIG. 8, is illustrated as attached to control components. In the example apparatus shown in FIGS. 1-3, a similar set-up would control each motor arrangement 210 and 220.

Motor arrangement 900 communicates with a control arrangement 965 to allow precision control of the patterned roll 960. Control arrangement 965 includes a drive module 966 and a program module 975. The program module 975 communicates with the drive module 966 via a line 977, for example, a SERCOS fiber network. The program module 975 is used to input parameters, such as set points, to the drive module 966. Drive module 966 receives input 480 volt, 3-phase power 915, rectifies it to DC, and distributes it via a power connection 973 to control the motor 910. Motor encoder 912 feeds a position signal to control module 966. The secondary encoder 950 on the patterned roll 960 also feeds a position signal back to the drive module 966 via to line 971. The drive module 966 uses the encoder signals to precisely position the patterned roll 960. The control design to achieve the degree of registration is described in detail below.

In the example embodiments shown, each patterned roll is controlled by a dedicated control arrangement. Dedicated control arrangements cooperate to control the registration between first and second patterned rolls. Each drive module communicates with and controls its respective motor assembly.

Various options are available for co-coordinating the two axes such as master/slave-type and parallel configurations, which was used in Applicants' system.

The control arrangement in the system built and demonstrated by Applicants include the following. To drive each of the patterned rolls, a high performance, low cogging torque motor with a high-resolution sine encoder feedback (512 sine cycles×4096 drive interpolation>>2 million parts per revolution) was used, model MHD090B-035-NG0-UN, available from Bosch-Rexroth (Indramat). Also the system included synchronous motors, model MHD090B-035-NG0-UN, available from Bosch-Rexroth (Indramat), but other types, such as induction motors could also be used. Each motor was directly coupled (without gearbox or mechanical reduction) through an extremely stiff bellows coupling, model BK5-300, available from R/W Corporation. Alternate coupling designs could be used, but bellows style generally combines stiffness while providing high rotational accuracy. Each coupling was sized so that a substantially larger coupling was selected than what the typical manufacturers specifications would recommend. Additionally, zero backlash collets or compressive style locking hubs between coupling and shafts are preferred. Each roller shaft was attached to an encoder through a hollow shaft load side encoder, model RON255C, available from Heidenhain Corp., Schaumburg, Ill. Encoder selection should have the highest accuracy and resolution possible, typically greater than 32 arc-sec accuracy. Applicants' design, 18000 sine cycles per revolution were employed, which in conjunction with the 4096 bit resolution drive interpolation resulted in excess of 50 million parts per revolution resolution giving a resolution substantially higher than accuracy. The load side encoder had an accuracy of +/−2 arc-sec; maximum deviation in the delivered units was less than +/−1 arc-sec.

Preferably, each shaft is designed to be as large a diameter as possible and as short as possible to maximize stiffness, resulting in the highest possible resonant frequency. Precision alignment of all rotational components is desired to ensure minimum registration error due to this source of registration error. One of ordinary skill in the art will recognize that there are various ways to reduce registration error due to alignment of the rotational components.

Figure 11:
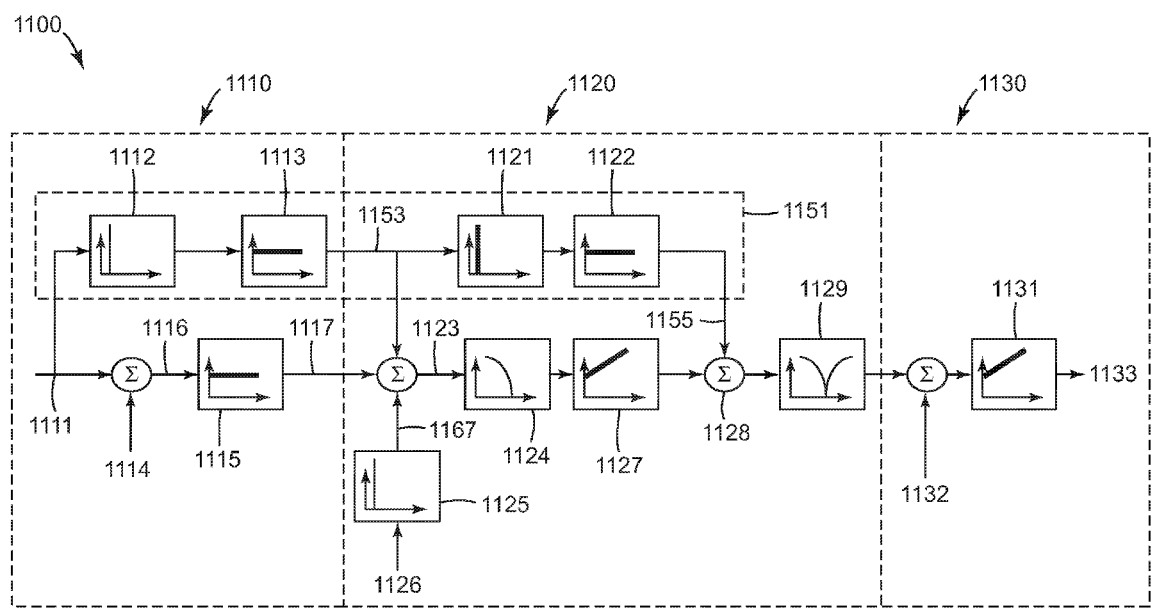
FIG. 11 illustrates a block diagram of an example embodiment of a method and apparatus for controlling registration according to the present disclosure.

The control strategy for each axis is implemented as follows:

Referring to FIG. 11, in Applicants' system identical position reference commands were presented to each axis simultaneously through a SERCOS fiber network at a 2 ms update rate. Each axis interpolates the position reference with a cubic spline, at the position loop update rate of 250 microsecond intervals. The interpolation method is not critical, as the constant velocity results in a simple constant times time interval path. The resolution is critical to eliminate any round off or numerical representation errors. Axis rollover must also be addressed. It is critical that each axis' control cycle is synchronized at the current loop execution rate (62 microsecond intervals).

The top path 1151 is the feed forward section of control. The control strategy includes a position loop 1110, a velocity loop 1120, and a current loop 1130. The position reference 1111 is differentiated, once to generate the velocity feed forward terms 1152 and a second time to generate the acceleration feed forward term 1155. The feed forward path 1151 helps performance during line speed changes and dynamic correction.

The position command 1111 is subtracted from current position 1114, generating an error signal 1116. The error 1116 is applied to a proportional controller 1115, generating the velocity command reference 1117. The velocity feedback 1167 is subtracted from the command 1117 to generate the velocity error signal 1123, which is then applied to a PID controller. The velocity feedback 1167 is generated by differentiating the motor encoder position signal 1126. Due to differentiation and numerical resolution limits, a low pass Butterworth filter 1124 is applied to remove high frequency noise components from the error signal 1123. A narrow stop band (notch) filter 1129 is applied at the center of the motor—roller resonant frequency. This allows substantially higher gains to be applied to the velocity controller 1120. Increased resolution of the motor encoder also would improve performance. The exact location of the filters in the control diagram is not critical; either the forward or reverse path are acceptable, although tuning parameters are dependent on the location.

A PID controller could also be used in the position loop, but the additional phase lag of the integrator makes stabilization more difficult. The current loop is a traditional PI controller; gains are established by the motor parameters. The highest bandwidth current loop possible will allow optimum performance. Also, minimum torque ripple is desired.

Minimization of external disturbances is important to obtaining maximum registration. This includes motor construction and current loop commutation as previously discussed, but minimizing mechanical disturbances is also important. Examples include extremely smooth tension control in entering and exiting web span, uniform bearing and seal drag, minimizing tension upsets from web peel off from the roller, uniform rubber nip roller. In the current design, a third axis geared to the tool rolls is provided as a pull roll to assist in removing the cured structure from the tool.

The web material can be any suitable material on which a microreplicated patterned structure can be created. Examples of web materials are polyethylene terephthalate, polymethyl methacrylate, or polycarbonate. The web can also be multilayered. Since the liquid is typically cured by a curing source on the side opposite that on which the patterned structure is created, the web material must be at least partially translucent to the curing source used. Examples of curing energy sources are infrared radiation, ultraviolet radiation, visible light radiation, microwave, or e-beam. One of ordinary skill in the art will appreciate that other curing sources can be used, and selection of a particular web material/curing source combination will depend on the particular article (having microreplicated structures in registration) to be created.

An alternative to curing the liquid through the web would be to use a two part reactive cure, for example, an epoxy, which would be useful for webs that are difficult to cure through, such as metal web or webs having a metallic layer. Curing could be accomplished by in-line mixing of components or spraying catalyst on a portion of the patterned roll, which would cure the liquid to form the microreplicated structure when the coating and catalyst come into contact.

The liquid from which the microreplicated structures are created is typically a curable photopolymerizable material, such as acrylates curable by UV light. One of ordinary skill in the art will appreciate that other coating materials can be used, and selection of a material will depend on the particular characteristics desired for the microreplicated structures. Similarly, the particular curing method employed is within the skill and knowledge of one of ordinary skill in the art. Examples of curing methods are reactive curing, thermal curing, or radiation curing.

Examples of coating means that useful for delivering and controlling liquid to the web are, for example, die or knife coating, coupled with any suitable pump such as a syringe or peristaltic pump. One of ordinary skill in the art will appreciate that other coating means can be used, and selection of a particular means will depend on the particular characteristics of the liquid to be delivered to the web.

Various modifications and alterations of the present invention will be apparent to those skilled in the art without departing from the scope and spirit of this invention, and it should be understood that this invention is not limited to the illustrative embodiments set forth herein.

What is claimed is:

1. A microreplicated article comprising:
a flexible substrate having first and second opposed surfaces;
a first coated microreplicated pattern on the first surface; and
a second coated microreplicated pattern on the second surface, wherein the first and second patterns are continuously registered to within 75 microns;
wherein the first microreplicated pattern includes features having a first shape and the second microreplicated pattern includes features having a second shape, wherein the each feature of the first pattern cooperates with a corresponding feature of the second pattern to form a lenticular lens.

2. The article of claim 1, wherein the lenses have a pitch of about 150 microns.

3. The article of claim 2, wherein the substrate material is polyethylene terephthalate.

4. The article of claim 1, further including a first land area between the first microreplicated pattern and the substrate and a second land area between the second microreplicated pattern and the substrate.

5. The article of claim 4, wherein the first land area is at least about 10 microns.

6. The article of claim 4, wherein the second land area is at least about 25 microns.

* * * * *

UNITED STATES PATENT AND TRADEMARK OFFICE
CERTIFICATE OF CORRECTION

PATENT NO. : 7,417,798 B2  Page 1 of 1
APPLICATION NO. : 11/747462
DATED : August 26, 2008
INVENTOR(S) : Vincent W. King It is certified that error appears in the above-identified patent and that said Letters Patent is hereby corrected as shown below:

Column 2
Line 3, delete the word "Hinka" and insert in place thereof -- Hlinka --.
Line 13, delete the word "Theilman" and insert in place thereof -- Thielman --.

Column 8
Line 37, delete "Applicants'system" and insert in place thereof -- Applicants' system --.

Signed and Sealed this

Second Day of December, 2008

JON W. DUDAS
*Director of the United States Patent and Trademark Office*